July 3, 1956     E. P. BONE     2,753,487
HEADLIGHT CONTROL SYSTEM

Filed May 13, 1953     3 Sheets-Sheet 1

INVENTOR.
EVAN P. BONE.
BY Charles M. Hogan
Warren Kunz
ATTORNEYS.

July 3, 1956

E. P. BONE 2,753,487

HEADLIGHT CONTROL SYSTEM

Filed May 13, 1953

INVENTOR.
EVAN P. BONE.
BY Charles M. Hogan
Warren Kunz.
ATTORNEYS.

July 3, 1956

E. P. BONE 2,753,487

HEADLIGHT CONTROL SYSTEM

Filed May 13, 1953

INVENTOR.
EVAN P. BONE.
BY
Charles M. Hogan
Warren Kunz
ATTORNEYS.

United States Patent Office 2,753,487
Patented July 3, 1956

2,753,487
HEADLIGHT CONTROL SYSTEM

Evan P. Bone, Cincinnati, Ohio, assignor to Midland Discount Company, Cincinnati, Ohio, a partnership of Ohio Application May 13, 1953, Serial No. 354,696

20 Claims. (Cl. 315—82)

The present invention relates to an improved system for controlling the light beams of automotive headlights and concerns more particularly an electro-mechanical system for blocking a portion of the light rays emanating from the headlights so that a shadow is cast on the eyes of the driver of an oncoming vehicle to protect him from glare.

The present invention has particular utility when used on an open highway at night under such conditions that it is desirable for the automobile having the improved system, hereinafter referred to as the "improved vehicle," to drive with its headlights elevated and at full beam strength to give maximum illumination of the roadway at all times. It will be appreciated by anyone familiar with such driving conditions that such maximum illumination is not ordinarily compatible with safe driving conditions since the modern headlight has sufficient intensity to blind the driver of an oncoming vehicle. Thus, it is customary to "dim" the lights of approaching vehicles to avoid dangerous glare, of necessity at the expense of adequate illumination for each driver. The danger inherent in driving with elevated lights is aggravated when vehicles are traveling at the high speeds feasible with modern vehicles on improved highways.

It is within the purview of this invention to provide a headlight including a mechanical shutter which is movable across the light beam of the headlight to cast a shadow on that portion of the road occupied by an oncoming vehicle. Position of the headlight shutter is regulated by a control unit which includes a control shutter, the movements of which establish corresponding movements of the headlight shutters. This control unit is responsive to the headlights of the oncoming vehicle and regulates the headlight shutters of the improved vehicle in such a fashion that the shadows cast thereby follow the oncoming vehicle as it approaches and passes the improved vehicle.

Experimental investigation has disclosed that in a novel system of this type the shutter in the control unit, and consequently the shutters in the headlights, have a tendency to hunt, with the result that the shadows cast on the oncoming vehicle do not follow it evenly and uniformly, but instead tend to wander slightly. If the hunting condition is severe, the light beams from the improved vehicle may oscillate across the oncoming vehicle producing a very undesirable variation of light intensity. It is an important object of the present invention to simply and economically eliminate such hunting tendencies and to provide a system which will steadily cast a shadow on the oncoming vehicle in the course of its movements.

Briefly stated, the present invention comprises an electro-mechanical system including a galvanometer (or other suitable orienting means) in each headlight and a similar galvanometer in the control unit. These galvanometers are connected in circuit (preferably in series) and are energized through a simple amplifying and rectifying tube including a control grid, the potential of which is determined by photoelectric emissions proportional to the passage of light through the shutter of the control unit to an associated photo tube. The shutter of the control unit is mechanically connected to the rotary element of the control unit galvanometer, that shutter being located and oriented so as to regulate the passage of light from the oncoming vehicle to the photo tube.

The galvanometer in each headlight is arranged to shift a shutter (which may be opaque) partially in front of the light beam emanating from the headlight. Being in series with the control unit galvanometer, the headlight galvanometers are influenced by a common flow of current and execute corresponding movements.

According to the present invention, an anticipating or rate circuit (i. e. means for introducing a first derivative signal) is also included in circuit with the galvanometers or other positioning means so as to produce a voltage, or current, or component proportional to the rate of change of the controlling or photo tube current, the resulting effect being that the shutters of both headlights and control unit do not tend to hunt undesirably, and the headlight shutters operate smoothly and precisely to cast a shadow constantly on the oncoming vehicle.

A broad object of the invention is to provide a control unit comprising a light sensitive signal generator, a shutter for controlling the passage of light to said generator, and orienting means responsive to the output of said generator to position said shutter, together with at least one similar headlight shutter, and means for synchronizing the shutter movements, said synchronizing means including a rate circuit for preventing hunting of said shutters.

It is also an object of the present invention to provide an improved form of shutter for the control unit which regulates the passage of light to the unit in such a fashion that the shutters in the headlights do not cast a shadow on the oncoming vehicle until the proximity of the oncoming and improved vehicle is such as to render the shadow desirable.

Another object of the present invention is to provide an improved shutter for the control unit which, after an initial response to the light from the oncoming vehicle, will shift to a position where light will be passed without obstruction to the photo tube of the control unit with sufficient intensity to assure smooth and continuous operation of the headlight shutters regardless of whether the oncoming vehicle's lights are bright or have been dimmed.

Still another object of the invention is the provision of an improved arcuate shutter for the control unit which is well adapted for use with an associated galvanometer and which is designed to intercept the light from the oncoming vehicle regardless of its position relative to the improved vehicle.

The system disclosed in this specification is an improvement of the invention disclosed in Patent 2,562,258 issued July 31, 1951, to E. P. Bone entitled "Headlighting System." For this reason, Figures 1 and 2 of that patent have been substantially reproduced to facilitate a basic understanding of the invention and the nature of the improvement.

The novel features that are considered characteristic of my invention are set forth in the appended claims; the invention itself, however, both as to its organization and method of operation, together with additional objects and advantages thereof, will best be understood from the following description of a specific embodiment when read in conjunction with the accompanying drawings, in which:

For convenience, the present invention will be described with particular reference to the application of the improvement to a single headlight of the improved vehicle, although it should be understood that in practice it would be applied to both headlights of the vehicle, or to any other light source used for illuminating the road in front of the improved vehicle.

Figure 1:
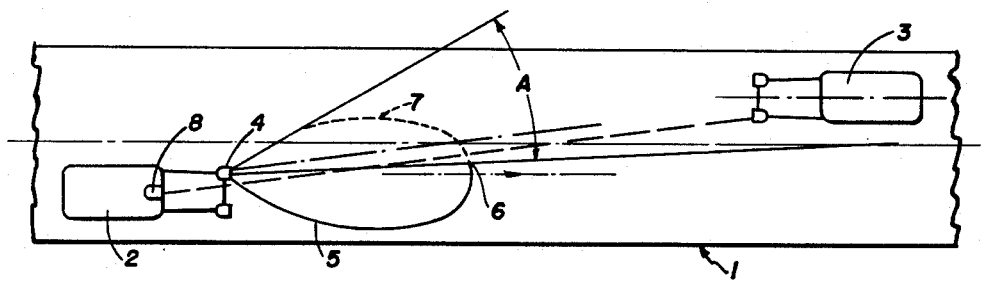
Figure 1 is a top plan view of the improved vehicle and an oncoming vehicle with the shutters of the improved vehicle in postion to cast a shadow on that portion of the road on which the oncoming vehicle is located.

With particular reference to Figure 1, there is illustrated a roadway, generally designated 1, and an improved vehicle 2 traveling towards the right on the roadway and approaching an oncoming car 3. The light emanating from headlight 4 of the improved vehicle normally is concentrated largely within the area bounded by the curved full and dash lines 4—5—6—7—4. When the oncoming vehicle has approached to the position illustrated in Figure 1, the shutter mechanism within headlight 4 operates to cast a shadow within angle A thereby blocking that part of the headlight beam falling within the area 4—6—7—4, a resulting shadow being cast across the roadway to that area occupied by oncoming vehicle 3.

Figure 2:
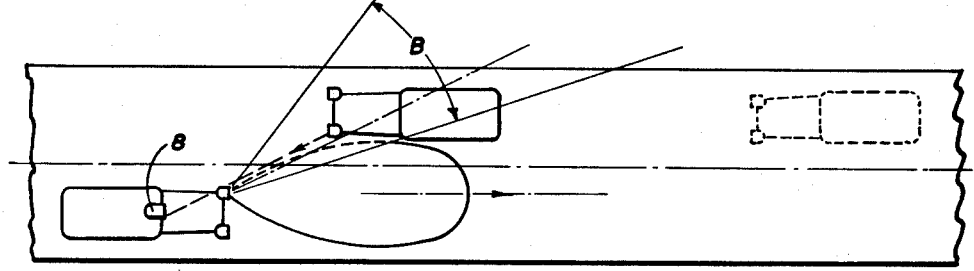
Figure 2 is a view similar to Figure 1, but with the vehicles in closer proximity, the shadow from the improved vehicle still being cast upon that portion of the road occupied by the oncoming vehicle.

With reference to Figure 2, the improved and oncoming vehicles are illustrated in closer proximity. It will be noted that the shadow is now cast through angle B, again in a position to cut off that portion of the improved vehicle's headlight beam which would prove detrimental to the visibility of the driver of the oncoming vehicle.

Figure 3:
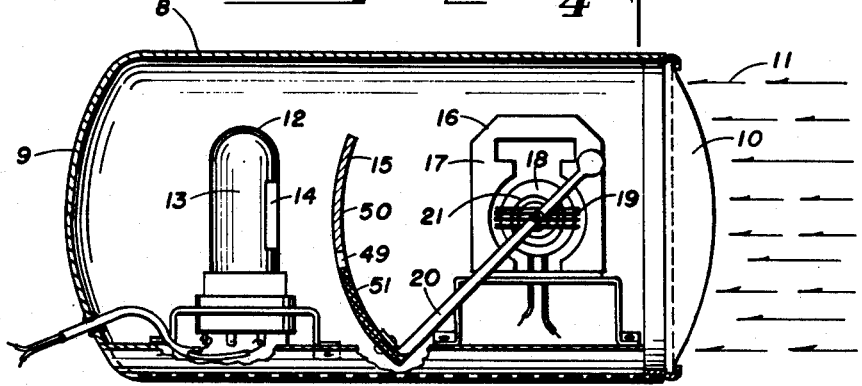
Figure 3 is a horizontal sectional view through the improved control unit showing a photoelectric tube, galvanometer, and an associated arcuate shutter in the position assumed when no oncoming vehicle is present.

Shift of position of the shadow imposed on the light beam of the oncoming vehicle is accomplished through the provision of a control unit 8 which, for convenience, may be located on top of the vehicle. This control unit is best illustrated in Figure 3. The unit comprises an outer metallic housing 9 and a plano-convex lens 10 at its forward end in position to receive light rays 11 projected by the headlights of the oncoming vehicle.

Positioned at the rear of the control unit is a photoelectric tube 12, the exterior of which preferably is opaque, as indicated at 13, with the exception of a small transparent area, or window, 14 through which light from the oncoming vehicle may pass, as will be explained, under the control of an arcuate shutter 15. This shutter is selectively positioned in front of the photo tube by means of a galvanometer 16, the galvanometer including a magnet or stator 17 and an armature or rotor 18. The galvanometer itself is conventional in construction and includes windings 19 on the armature and a projecting counterbalanced arm 20 which rotates conjointly with the armature. A spiral coil spring 21 extends between arm 20 and a fixed part of the galvanometer to constantly urge shutter 15 towards the position illustrated in Figure 3.

Figure 4:
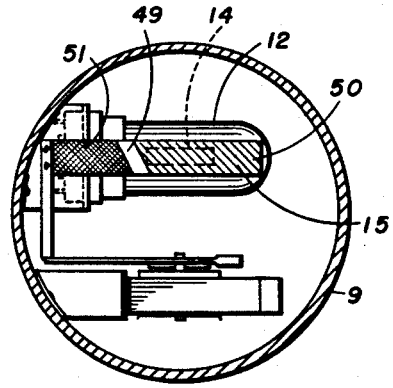
Figure 4 is a cross sectional view taken on plane 4—4 of Figure 3 showing in vertical elevation the photoelectric tube, galvanometer, and associated shutter.

The vertical disposition of the elements in the control unit is illustrated in Figure 4 where it will be noted that the galvanometer is located so as not to obstruct passage of light through shutter 15 to the photoelectric tube 12.

The specific construction of the shutter 15 will be considered in greater detail hereinafter.

Figure 7:
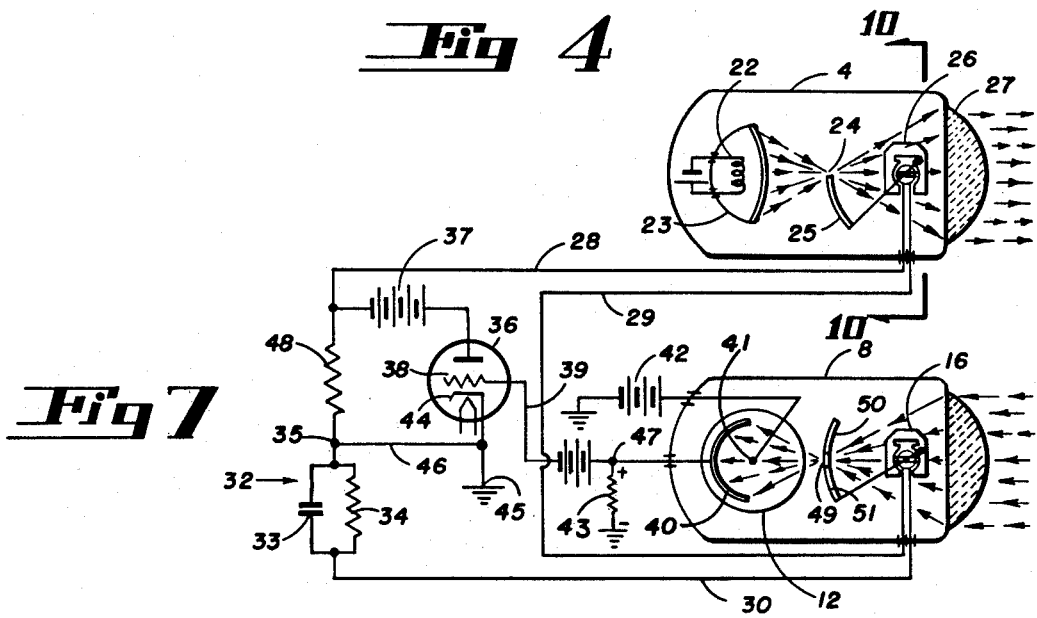
Figure 7 is a simplified diagram showing the electrical circuit for energizing the galvanometers of the control unit and a headlight.

Attention is now directed to Figure 7 which shows schematically control unit 8 and the vehicle's headlight 4. The particular form of headlight illustrated is disclosed in U. S. Patent 1,389,291 issued to E. P. Bone in 1921. The light source is an incandescent filament 22 located at the rear focus of an ellipsoid reflector 23. The light reflected by the reflector passes through the forward focus 24 in position to be intercepted selectively by a headlight shutter 25 which is controlled by headlight galvanometer 26.

The headlight galvanometer is similar to construction to the galvanometer used in the control unit, and swings shutter 25 into the light beam reflected by reflector 23 before it is transmitted through headlight lens 27.

The electrical circuitry of the control unit and headlight galvanometer may now be considered. With particular reference to Figure 7, it will be noted that the windings of galvanometers 16 and 26 are in series, being connected through conductors 28, 29, and 30. Conductor 29 extends directly between the galvanometers whereas conductors 28 and 30 connect the galvanometers to a plate circuit resistor 48.

Interposed between conductor 30 and the plate circuit resistor 48 is an anticipating or rate circuit, generally designated 32. This circuit includes a capacitor 33 and resistor 34 which are in parallel between conductor 30 and terminal 35 of the plate resistor.

Resistor 48 is the plate load resistor of a triode or other suitable power-amplifying tube 36. The plate of this tube is supplied with current from a B battery 37 which is connected between the plate and the junction of the plate resistor with conductor 28. As is conventional, the triode includes a suitably biased control grid 38 which is connected through conductor 39 to the cathode 40 of photoelectric tube 12. Tube 36 is normally nonconductive and its plate circuit passes current only in response to signals from tube 12. The anode 41 of the photoelectric tube is connected to ground through a small bias battery 42. A resistor 43 is connected between point 47 and ground, as indicated, to complete the direct current path for photoelectric emissions.

It is to be noted that the cathode 44 of the triode is grounded at 45 and is also connected through conductor 46 to terminal 35 in order to complete the plate circuit of tube 36.

In a manner well understood by those skilled in the art, cathode 40, when stimulated by light, passes electrons to anode 41. The circuit for current flow is through battery 42, the photo tube 12 and resistance 43 to ground. The resulting current flow through resistor 43, which is proportional to light intensity, establishes a proportional positive potential at point 47 which is impressed on grid 38. As the potential of the grid overcomes the initial negative bias and becomes more positive, current flows increasingly through triode 36 and its plate circuit resistor 48.

The potential drop due to the flow of anode current through resistor 48 establishes a proportional current flow through the galvanometers, resulting in a predetermined orientation of the shutters associated therewith. It should be noted that any conventional light-sensitive signal generating circuit may be used to provide the main controlling current component. I do not desire to be limited to that here shown. For example, battery 42 may be omitted. Further, the resistor 48 can be omitted; and the galvanometers and rate circuit may be arranged in series between anode and cathode of tube 36, and that tube then shunt fed by a plate battery.

With reference to Figures 3 through 7, it will be noted that shutter 15 is provided with a clear transparent central area 49 which is bounded by a semi-transparent area 50 and an opaque area 51. The purpose of this construction will be described more fully later, and it is sufficient to understand at this time that clear area 49 normally passes light from the oncoming vehicle to the photo tube during the time that a shadow is cast upon the oncoming vehicle.

Figure 5:
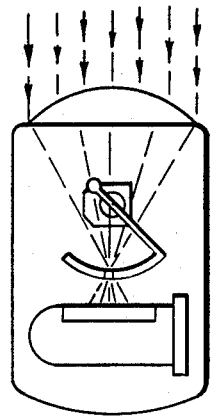
Figure 5 is a schematic representation showing a plan view of the control unit in the position assumed when the oncoming vehicle is relatively distant from the improved vehicle, as in Figure 1.
Figure 6:
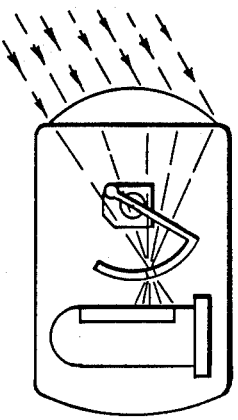
Figure 6 is also a schematic plan view of the control unit showing the position of the shutter assumed when the oncoming vehicle is closer, as indicated in Figure 2.

As the direction of the light from the oncoming vehicle changes, the concentration of light as partially intercepted by shutter 15 shifts position slightly, as illustrated by Figures 5 and 6.

Figure 5 illustrates the relative position of light rays and shutter for a distant oncoming vehicle, while Figure 6 illustrates them for an oncoming vehicle close to the improved vehicle. As the concentration of light at the shutter changes position gradually, it is momentarily blocked from passage to the photo tube by opaque area 51, and the flow of current through the galvanometer resulting from photo tube excitation decreases, reducing the current in the galvanometers, and permitting the galvanometer spring of the control unit to move the shutter from the position of Figure 5 toward that of Figure 6. The movement of the shutter 15 shifts transparent area 49 to a position where light rays are again passed to the photo tube and photo tube current is again established at a value commensurate with the control galvanometer position.

Since the control unit constitutes a self-excited system, and since the shutter of the control unit has inertia, it will be understood that hunting of the shutter may result as it moves correspondingly with the change of position of the light from the oncoming vehicle. Such hunting or variation of the shutter is highly undesirable; the shutter in the headlight moves correspondingly and causes the shadow cast on the oncoming vehicle to oscillate in a confusing manner which does not comfort with safe driving conditions.

The anticipating circuit 32 precludes such an undesirable effect since the storage and dissipation of energy from capacitor 33 anticipates and is in opposition to the main component of potential increase and decrease, respectively, across the series galvanometer circuit resulting from change of photo tube excitation. As a result, a counter-current component, or first-derivative component, is generated by the anticipating circuit as the shutters approach the position of rest dictated by the principal control current component, and movement of the control unit shutter is uniform and consistent, commensurate with the change of position of the oncoming vehicle.

During the time that photo tube excitation is increasing or decreasing, the resulting current component produced by the anticipating circuit is passed through resistor 48 and the conductors 28, 29, and 30, retarding or accelerating, as may be required, the movements of the series galvanometers.

Figure 8:
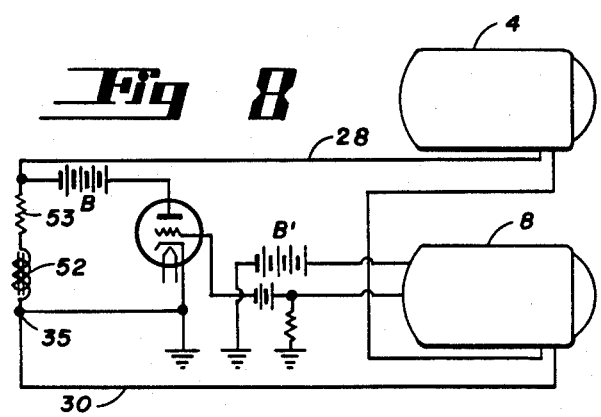
Figure 8 shows a modification of the circuit illustrated in Figure 7.

A modification of the circuit is illustrated in Figure 8, which shows an inductance 52 in series with a resistance 53 between conductors 28 and 30. A counter-voltage component, produced by the inductance during variations of photo tube excitation, again is in opposition to the principal potential change across the plate circuit resistor 53 and precludes undesirable hunting.

Figure 9:
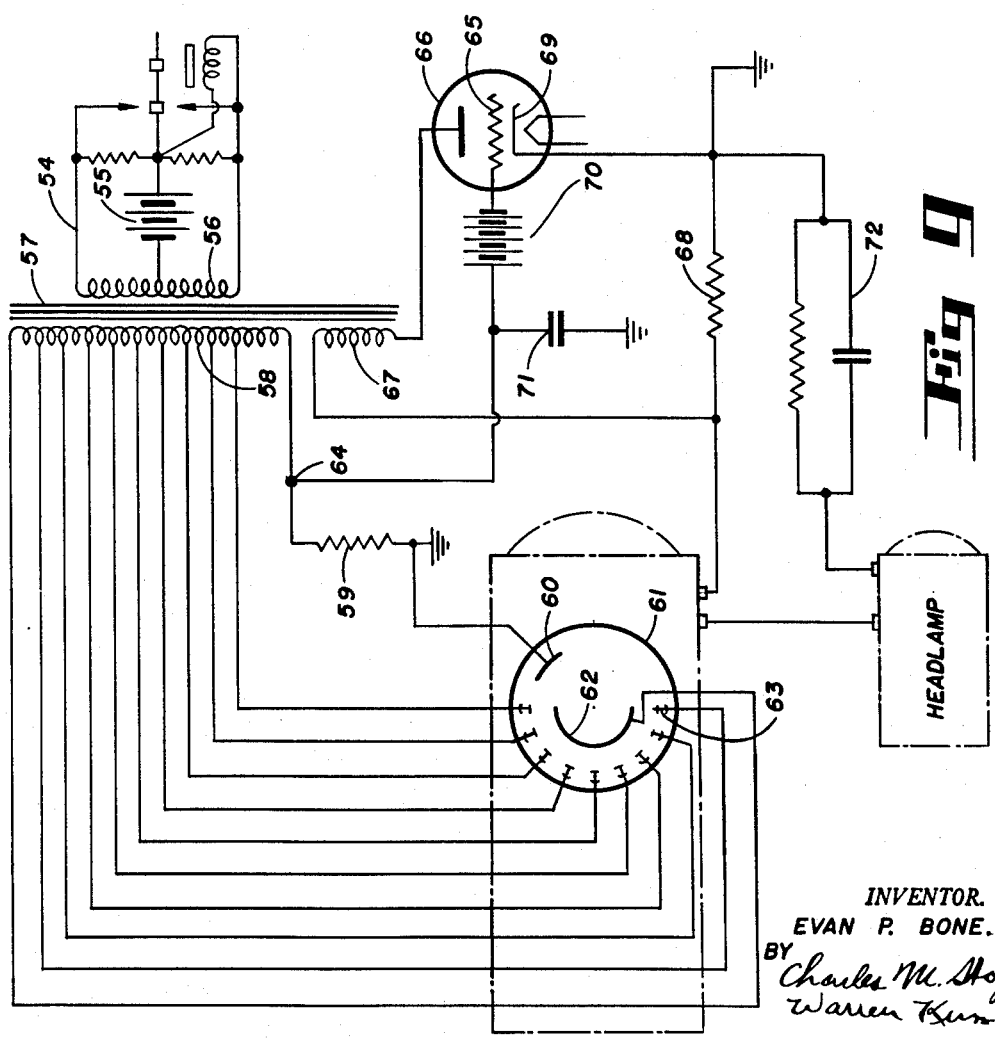
Figure 9 shows another circuit for use in a motor vehicle.

A system which is practical for use in a modern automotive vehicle is illustrated in Figure 9. With reference to this figure, it will be noted that the circuit includes a vibrator 54 which is supplied with current from low-voltage battery 55. The output coil 56 of the vibrator comprises the primary winding of a transformer 57. Two secondary windings are provided on the transformer, winding 58 being in series with resistance 59 which is connected to ground and to anode 60 of a multiplier photo tube 61.

This photo tube includes the anode 60, cathode 62, and a plurality of dynodes 63. Winding 58 is evenly tapped by a plurality of conductors connected to dynodes 63 and is connected through resistance 59 to anode 60 of the photo tube, as has been described. A substantial current flows through resistance 59 to anode when the photo tube is excited by light from the oncoming vehicle. The resulting positive potential at terminal 64 is applied to grid 65 of triode 66. A source of space-current flow through the triode is provided by secondary winding 67 of transformer 57, the circuit being completed through plate resistance 68 and cathode 69 of the triode 66.

Battery 70 biases grid 65 in a conventional manner. Filter capacitor 71, provided between grid and ground, collects charge from the photo current and maintains a steady positive potential at the grid during periods of potential reversal resulting from alternation of the vibrator.

As in the circuit diagrams illustrated in Figure 7, an anticipating circuit 72 is provided to prevent hunting of the control shutter.

As indicated above, any conventional light-sensitive multiplying circuit may be used to control the signal supplied to the amplifier tube 66.

Suitable light sensitive signal generators are shown in:

Albert, "Electrical Fundamentals of Communication," pp. 433–435, 494–495, McGraw-Hill, New York, 1942.

Reich, "Theory and Applications of Electron Tubes," pp. 543–545 (showing both D. C. and A. C. forward photo tube circuits), pp. 551–552 (showing secondary-emission multipliers), McGraw-Hill, 1942.

Ghirardi, "Radio Physics Course," pp. 842–843 (showing in Fig. 139 the basic battery-operated forward amplifier circuit herein shown), Radio Technical Publishing Co., New York, 1942.

Batcher and Moultic, "The Electronic Engineering Handbook," p. 313 (showing in Fig. 234-II a suitable battery-operated amplifier circuit), Electronic Development Associates, New York, 1944.

Suitable basic multiplier circuits are well-known in the art, as illustrated by U. S. Patent 2,585,044, issued February 12, 1952, to A. W. Sanders.

It will be understood that a wide range of light-sensitive tubes and cells is available for producing electrical signals indicative of light intensities.

Reference is made to the above publications for the details of light-sensitive generators and amplifiers suitable for utility herein.

Attention should now be directed to the formation of the control unit shutter 15. As has been explained, the shutter comprises a semitransparent area 50, a clear transparent area 49, and an opaque area 51. As illustrated in Figure 3, the shutter in horizontal plan view is arcuate, the center of curvature coinciding with the axis of rotation of armature 18. The arcuate formation makes possible interception of the light beams passing through lens 10 regardless of the direction from which the beams come. Thus, the curvature of the shutter compensates for deviations of the principal focal plane of lens 10 from the true focal plane. Further, the arcuate formation is commensurate with movement of armature 18 about a fixed center.

The semi-transparent area of the shutter is normally positioned in front of the photo tube 12 during the time that the improved vehicle is traveling down a clear road. As an oncoming vehicle comes into sight, semi-transparent area 50 at first blocks passage of sufficient light to excite the photo tube 12 significantly. As the oncoming vehicle approaches, the light intensity increases until sufficient current is passed by the photo tube to swing the shutter from the position shown in Figure 3 to the position illustrated in Figure 5. Movement of the shutter to the latter position is indicative of the fact that the oncoming vehicle is close enough to permit casting a shadow upon it to preclude glare without endangering total road illumination.

When the transparent area 49 is shifted before window 14 of the photo tube, full light intensity from the oncoming vehicle is transmitted to the photo tube, and the control unit constantly keeps a shadow cast on the oncoming vehicle thereafter. Even if the lights of the oncoming vehicle are dimmed, sufficient light is passed by fully transparent area to keep the system in operation with the shadow cast on the oncoming vehicle.

Thus, through the particular shutter construction illustrated, the system is prevented from operating prematurely and continuous projection of a shadow on the oncoming vehicle is assured once the system goes into operation.

Another advantage of semi-transparent area 50 is that secondary light sources along the road do not stimulate the system into operation.

By limiting the vertical extent of window 14, the passage of light from street lights to the control unit is precluded and assurance is given that the control unit will be primarily responsive to the headlights of oncoming vehicles. As an alternative construction, the exterior of the photo tube need not be opaque. Instead, the vertical extent of that area of the shutter 15 capable of passing light may be reduced to block passage of extraneous light rays.

With reference to Figure 4, it should be noted that transparent area 49 is in the form of a diagonal slit inclined from the upper left to the lower right. The transparent area is formed in this manner to compensate for change in vertical attitude of the improved vehicle as it traverses hilly or rough terrain. In other words, as the improved vehicle rises and falls with resulting relative change of direction of light from the oncoming vehicle, the control unit shutter will change position slightly because of the angularity of slit 49, and a corresponding movement of the headlight shutter will result so that a shadow will be uniformly and constantly cast on the oncoming vehicle.

The function of slit 49 will be understood if it is appreciated that in any operating position, a portion of the light focused by control unit lens 10 falls upon opaque area 51 of shutter 15 and a portion passes through transparent area 49 to the photo tube. Since slit 49 is formed diagonally, as illustrated, shift of relative position of the focused light resulting from change of vertical attitude of the improved vehicle, results in either an increased or decreased passage of light through the slit to the photo tube depending upon the inclination or declination, respectively, of the improved vehicle. The resulting change of photo tube excitation causes a corresponding change of headlight shutter position and the shadow is cast fully upon the oncoming vehicle at all times.

Figure 10:
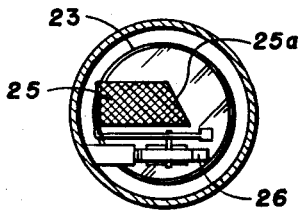
Figure 10 is a simplified schematic view in vertical elevation showing the headlight shutter as viewed on plane 10—10 of Figure 7.

As illustrated in Figure 10, the headlight shutter 25 has a diagonal end 25a which produces a shadow conforming in shape to the perspective of the roadway as viewed by the driver of the improved vehicle. By virtue of the diagonal position of slit 49, shutter 25 is shifted as the improved vehicle rises and falls so that the part of the shadow produced by end 25a falls substantially on the center line of the roadway at all times. For a detail discussion of the factors bearing on this general problem, see the Bone Patent 1,480,803, issued on January 15, 1924.

Shutter 25 may be opaque so that all radiations are blocked out of the shadowed area of the roadway. It may be desirable, however, to make shutter 25 conductive to ultra violet and infra red radiations so that the oncoming vehicle, if provided with the improved system, will receive radiations for operating its system. Thus, if all vehicles were equipped with the improved system, the photo tubes could be made responsive to the ultra violet or infra red radiations, which would be suitable for operating the systems but which would produce no visible effect as far as the drivers of the improved vehicles were concerned.

It should be recognized that amplification of the photo tube control signal, although desirable, is not a requirement of the invention. Where a suitable potential is established by the photo tube itself, amplification is not necessary.

Having described a preferred embodiment of my invention, I claim:

1. In combination in an improved headlight control system including a headlight having a shutter actuated in azimuth by a galvanometer to intercept its light rays and a control unit having a galvanometer for continuously positioning a second shutter in azimuth for intercepting light rays from an oncoming vehicle, a photoelectric tube in the control unit positioned to receive light rays transmitted by the control unit shutter, a circuit completed through said photoelectric tube the current flow in which is proportional to excitation of said photoelectric tube, an amplifying circuit including a triode having a grid the potential of which is proportional to flow of current in the photo tube circuit, said triode having a plate circuit in series with said galvanometers, said amplifying circuit producing a current flow through said series galvanometer circuit in proportion to photoelectric tube stimulation, and an anticipating circuit in series with said series galvanometer circuit for producing a counter-voltage component in opposition to changes of potential in said series galvanometer circuit whereby hunting of said first and second named shutters is precluded.

2. In combination in an improved headlight control system for installation on an improved vehicle responsive to light emanating from an oncoming vehicle, a headlight for projecting light rays through a focal point and in front of the improved vehicle, a control unit including a photoelectric tube for receiving light rays from the oncoming vehicle, a galvanometer in said headlight, an opaque shutter continuously rotatably positioned in azimuth by said galvanometer relative to the focal point of the headlight beam, a galvanometer in said control unit, an arcuate shutter rotatably positioned in azimuth by said last named galvanometer to intercept light received from said oncoming vehicle and for regulating passage thereof to said photoelectric tube, said first and second named galvanometers being in series circuit, an electron tube including a control grid and an anode, means for supplying electrical energy to said electron tube, a resistor in series with the anode of said electron tube and energy supply means, the series circuit of said galvanometers being connected in parallel with said resistor, a battery in series circuit with said photoelectric tube, a ground-connected resistor through which current may flow in circuit with said battery and photoelectric tube when said photoelectric tube is excited by light from the oncoming vehicle, the resulting potential at one point of said last named resistor being impressed upon said grid, and a parallel capacitor resistance anticipating circuit connected in series in said series galvanometer circuit.

3. In combination in an improved headlight control system, a control unit, a photoelectric tube in said control unit, a galvanometer in said control unit, an arcuate shutter continuously adjustably positioned in azimuth by said galvanometer relative to said photoelectric tube, a headlight, a galvanometer in said headlight, an opaque arcuate shutter continuously adjustably positioned in azimuth within said headlight by its galvanometer, said headlight and control unit galvanometers being connected in series circuit, an amplifying tube including a control grid, an electrical circuit including said photoelectric tube for producing a control potential for said grid, a current supply circuit connected to said amplifying tube including a series resistor, said series galvanometer circuit being connected in parallel with said resistor, and a parallel capacitor-resistance differentiating circuit in series with said series galvanometer circuit.

4. In combination, a headlight, a control unit, galvanometers in said headlight and control unit, shutters continuously adjustably positioned in azimuth within said headlight and said control unit by said respective galvanometers, a photoelectric tube within said control unit adjacent said control unit shutter, a circuit connected to said photoelectric tube, an electron tube including a control grid, said photoelectric tube developing a potential which is impressed upon said control grid, an amplifying circuit connected to said electron tube including a series resistor, said galvanometers being connected in parallel with said resistor, and an anticipating capacitor-resistance circuit also in series with said galvanometers.

5. In combination, a control unit including a photoelectric tube, galvanometer, and shutter continuously adjustably positioned in azimuth by said galvanometer relative to said photoelectric tube; a headlight including a galvanometer and a shutter continuously adjustably positioned in azimuth within said headlight by said galvanometer; an electrical circuit in series with said photoelectric tube; an amplifying tube having a control grid the potential of which is proportional to current flow in said photoelectric tube circuit; a circuit connected with said amplifying tube including a resistance and a differentiating inductance in series; and a series circuit including said galvanometers connected in parallel across said resistance and inductance.

6. A control unit comprising a housing, a horizontally disposed photoelectric tube at the rear of said housing, a galvanometer at the front of said housing, an arcuate shutter disposed adjacent said photoelectric tube, means interconnecting said galvanometer and said shutter for adjustably continuously positioning it in azimuth relative to said photoelectric tube in proportion to current flow through said galvanometer and light concentrating means in front of said galvanometer for focusing light on said shutter, said shutter comprising an opaque area, a semi-transparent area, and a transparent area between said opaque and semi-transparent areas.

7. A control unit for receiving light rays from an oncoming vehicle comprising a housing, a photoelectric tube at the rear of said housing, a galvanometer, a shutter adjustably positioned in azimuth by said galvanometer in front of said photoelectric tube and light concentrating means for receiving light from the oncoming vehicle and concentrating it on said shutter, said shutter having an arcuate formation including a semi-transparent area, an opaque area, and a transparent area between said opaque and semi-transparent areas.

8. A control unit for receiving light from an oncoming vehicle comprising a photoelectric tube, current responsive means, a shutter continuously adjustably positioned in azimuth relative to said photoelectric tube by said current responsive means in proportion to the current flow therethrough, light concentrating means for focusing light from said oncoming vehicle on said shutter, said shutter having an arcuate formation for intercepting the focused light from said light concentrating means regardless of the direction of its impingement thereon, said arcuate shutter including a semi-transparent area at one of its extremities, an opaque area at the opposite extremity, and a transparent area therebetween.

9. Apparatus as defined in claim 8 in which said transparent area comprises a diagonally positioned slit across the face of said shutter.

10. The combination of a light sensitive electrical signal generating device for detecting the direction of an oncoming light emanating vehicle, a shutter continuously movable in azimuth for controlling the passage of light from said oncoming vehicle to said light sensitive device, means including an amplifier controlled by signals generated by said light sensitive device for orienting said shutter, and means for introducing a rate of change component into the output of said amplifier, said shutter being rotated about an axis displaced from itself.

11. An automobile headlight having a shutter continuously movable in azimuth for controlling the orientation of a shadow relative to an oncoming car, means including a light sensitive electrical signal generator, means including an amplifier for controlling the position of said shutter as a function of the output of said light sensitive device, and means for rendering the motion of said shutter partially dependent on the first derivative of said output, said shutter being rotated about an axis displaced from itself.

12. The combination of a light sensitive electrical signal generating device for detecting the direction of an oncoming light emanating vehicle, a shutter for controlling the passage of light from said oncoming vehicle to said light sensitive device, means controlled by signals generated by said light sensitive device for continuously orienting said shutter in azimuth, and means for introducing a rate of change component into said signals, said shutter being rotated about an axis displaced from itself.

13. An automobile headlight having a continuously movable shutter for controlling the orientation of a shadow relative to an oncoming car, means including a light sensitive electrical signal generator, means for controlling the position of said shutter in azimuth as a function of the output of said light sensitive device, and means for rendering the motion of said shutter partially dependent on the first derivative of said output, said shutter being rotated about an axis displaced from itself.

14. In an automobile lighting system a direction finder for continuously measuring the relative bearing of an approaching radiant energy source comprising a photosensitive signal generator, an arcuate-vane and a galvanic movement actuated by said generator to position said vane in azimuth so that said vane intercepts radiant energy transmitted from said source to said generator and asumes an orientation indicative of such relative bearing.

15. In an automobile lighting system a follow-up device for determining and continuously measuring the bearing of an approaching radiant energy source comprising arcuate-vane light-intercepting means and D'Arsonval-type meter movement means responsive to energy from said source for positioning the light-intercepting means.

16. In an automobile head lamp the combination of reflecting means for concentrating the light rays, an arcuate shadow-casting vane at the locus of such concentration and means including a galvanometer movement for positioning such vane so as to control the position of such vane in azimuth.

17. In an automobile head lamp the combination in accordance with claim 16 in which the lamp vane is constructed of a material which filters out visible light and passes invisible radiation.

18. In an automobile lighting system a direction finder in accordance with claim 14 in which the vane is curved in an arc having a radius equal to its radius of rotation.

19. In an automobile head lamp the combination of reflecting means for concentrating the light rays, a shadow casting vane at the locus of such concentration, said vane being constructed at least in part of a material which filters out visible light and passes invisible radiation, and means for positioning such vane so as to control the orientation of the shadow cast by the vane.

20. In an automobile lighting system a direction finder for continuously measuring the relative bearing of an approaching light source comprising a photosensitive signal generator, lens means for concentrating light on said generator and means actuated by said generator to position said vane so that said vane intercepts light transmitted from said source to said generator and assumes an orientation indicative of such relative bearing, said vane being formed with a curvature compensatory of the deviations of the principal focal plane of the lens from its true focal plane.

References Cited in the file of this patent

UNITED STATES PATENTS

| | | |
|---|---|---|
| 1,389,291 | Bone | Aug. 30, 1921 |
| 1,761,811 | Bone | June 3, 1930 |
| 2,317,559 | Stout | Apr. 27, 1943 |
| 2,326,878 | Muller | Aug. 17, 1943 |
| 2,375,665 | Koulicovitch | May 8, 1945 |
| 2,560,748 | Silva | July 17, 1951 |
| 2,562,258 | Bone | July 31, 1951 |
| 2,615,079 | Pardue et al. | Oct. 21, 1952 |